United States Patent
Hill (10) Patent No.: US 8,945,289 B2
(45) Date of Patent: *Feb. 3, 2015

(54) SEPARATOR WITH A HELIX ASSEMBLY

(71) Applicant: OneSubsea, LLC, Houston, TX (US)

(72) Inventor: Ronald J. Hill, Pearland, TX (US)

(73) Assignee: OneSubsea, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,485

(22) Filed: Dec. 17, 2013

(65) Prior Publication Data
US 2014/0102303 A1    Apr. 17, 2014

Related U.S. Application Data

(60) Division of application No. 13/866,690, filed on Apr. 19, 2013, now Pat. No. 8,636,196, which is a continuation of application No. PCT/US2011/055678, filed on Oct. 11, 2011, which is a continuation of application No. 12/908,103, filed on Oct. 20, 2010, now Pat. No. 8,361,208.

(51) Int. Cl.
*B01D 19/00* (2006.01)

(52) U.S. Cl.
CPC ........ *B01D 19/0052* (2013.01); *B01D 19/0057* (2013.01); *B01D 19/0042* (2013.01)
USPC ................................. 96/216; 96/208; 95/261

(58) Field of Classification Search
CPC .................................................. B01D 19/0057
USPC ....................................... 96/216, 208; 95/261
See application file for complete search history.

(56) References Cited

U.S. PATENT DOCUMENTS

| 2,228,401 | A | * | 1/1941 | Pressler | 96/164 |
| 2,593,714 | A | | 4/1952 | Robinson | |
| 3,073,944 | A | | 1/1963 | Yuter | |
| 3,090,336 | A | | 5/1963 | Gruter | |
| 3,161,490 | A | * | 12/1964 | Dudek | 96/210 |
| 3,186,063 | A | | 6/1965 | Dopp | |
| 3,201,919 | A | * | 8/1965 | Long | 95/254 |
| 3,318,376 | A | | 5/1967 | Vihl | |
| 3,415,092 | A | | 12/1968 | Dean et al. | |
| 3,812,564 | A | | 5/1974 | Shapiro | |

(Continued)

FOREIGN PATENT DOCUMENTS

| JP | 58174255 A | 10/1983 |
| JP | 2010119623 A | 6/2010 |
| WO | 2007021337 A1 | 2/2007 |

OTHER PUBLICATIONS

International Search and Written Opinion dated May 30, 2012 for PCT Application No. PCT/US2011/055678 filed Oct. 11, 2011.

*Primary Examiner* — Duane Smith
*Assistant Examiner* — Douglas Theisen
(74) *Attorney, Agent, or Firm* — Chamberlain Hrdlicka (57) ABSTRACT

A separator with a helix assembly that includes a plurality of segments disposed end to end and forming an intermediate casing. Each of the segments has a tubular portion with a first circumferential edge and a second circumferential edge and a helical portion extending from the second circumferential edge. The tubular portions of the segments form an intermediate casing, while the helical portions of the segments form a spiral helix. The helix assembly further includes an inner casing concentrically disposed within the intermediate casing and coupled to the spiral helix.

11 Claims, 5 Drawing Sheets

(56) References Cited

U.S. PATENT DOCUMENTS

| | | | |
|---|---|---|---|
| 3,818,740 A | 6/1974 | Gebauer | |
| 3,861,574 A | 1/1975 | Hoffmann | |
| 4,141,481 A | 2/1979 | Van Petten | |
| 4,376,676 A * | 3/1983 | Gill | 196/46 |
| 4,563,279 A | 1/1986 | Wright | |
| 4,569,386 A | 2/1986 | Mine | |
| 4,640,453 A | 2/1987 | Oe et al. | |
| 4,664,307 A | 5/1987 | Curry et al. | |
| 5,085,826 A | 2/1992 | Oosterkamp | |
| 5,180,095 A | 1/1993 | Orth | |
| 5,456,405 A | 10/1995 | Stagg | |
| 5,482,117 A | 1/1996 | Kolpak et al. | |
| 5,570,744 A | 11/1996 | Weingarten et al. | |
| 5,979,551 A | 11/1999 | Uban et al. | |
| 6,036,749 A | 3/2000 | Ribeiro et al. | |
| 6,743,359 B1 | 6/2004 | Smyth et al. | |
| 8,361,208 B2 * | 1/2013 | Hill | 96/216 |
| 2003/0234273 A1 | 12/2003 | Grotti | |
| 2004/0004110 A1 | 1/2004 | Blackburne, Jr. | |
| 2007/0199973 A1 | 8/2007 | Tueshaus et al. | |
| 2008/0211134 A1 | 9/2008 | Grey | |
| 2009/0139938 A1 | 6/2009 | Larnholm et al. | |
| 2009/0242490 A1 | 10/2009 | Hopper | |
| 2010/0095508 A1 | 4/2010 | Wahlen et al. | |
| 2010/0288822 A1 | 11/2010 | Chung et al. | |
| 2012/0247719 A1 | 10/2012 | Kidwell et al. | |

* cited by examiner

SEPARATOR WITH A HELIX ASSEMBLY

STATEMENT REGARDING FEDERALLY SPONSORED RESEARCH OR DEVELOPMENT

Not applicable.

BACKGROUND

The disclosure relates to a vertical separator for separating a fluid stream into a liquid phase stream and a gas phase stream. More particularly, the disclosure relates to a method for fabricating a helix of the vertical separator.

Separators are commonly used at subsea fields to separate produced wellbore fluids into gas and liquid streams. Many of these separators include a helix assembly. The helix assembly has an intermediate casing, an inner casing concentrically disposed within the intermediate casing, and a helix connected therebetween. The helix extends normally from each of the intermediate and inner casings and spans their lengths in a spiraling fashion.

During operation, a fluid, such as a two-phase wellbore fluid, is injected through a port in the upper end of the intermediate casing into the annulus between the intermediate and inner casings. Due to gravity, the fluid is routed over and along the helix toward the lower end of the annulus. As the fluid travels, the liquid phase moves toward the lowest point of the helix at the wall of the inner casing due to its density. At the same time, the gas phase moves to the highest point of the annulus, also due to its density. In this manner, the liquid and gas phases are separated from the fluid as it passes over and along the helix. Gas and liquid are subsequently conveyed from the separator in separate streams.

Once the gas phase is separated from the fluid passing over the helix, it is critical to the effectiveness of the separator that they remain separated and do not inadvertently re-mix. For this reason, the connections between the helix and intermediate casing and between the helix and inner casing should be fluid tight to prevent remixing of the fluid with the separated gas. Accordingly, means which enable such fluid tight connections are desirable. It would be particularly advantageous if such means enable ease of helix assembly fabrication.

SUMMARY OF THE DISCLOSURE

A separator with a helix assembly and methods for fabricating the helix assembly are disclosed. In some embodiments, the separator includes an outer casing in which the helix assembly is disposed. The helix assembly includes a plurality of segments coupled end to end. Each of the segments has a tubular portion with a first circumferential edge and a second circumferential edge and a helical portion extending from the second circumferential edge. The tubular portions of the segments form an intermediate casing, while the helical portions of the segments form a spiral helix. The helix assembly further includes an inner casing concentrically disposed within the intermediate casing and coupled to the spiral helix. In some embodiments, abutting circumferential edges of adjacent segments are connected by a seal weld.

Some methods for fabricating the helix assembly include inserting an inner casing into a first segment, coupling a circumferential edge of the first segment to the inner casing, and joining one or more subsequent segments to the inner casing. The joining of each subsequent segment to the inner casing includes lowering the subsequent segment about the inner casing to seat on the previously-installed segment and coupling abutting circumferentially extending edges of the subsequent segment and the previously-installed segment with a seal weld.

Thus, embodiments described herein comprise a combination of features and characteristics intended to address various shortcomings associated with conventional separator helix assemblies and associated fabrication methods. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

The following description is directed to exemplary embodiments of a separator sub-assembly with a helix assembly and an associated method of fabrication. The embodiments disclosed should not be interpreted, or otherwise used, as limiting the scope of the disclosure, including the claims. One skilled in the art will understand that the following description has broad application, and that the discussion is meant only to be exemplary of the described embodiment, and not intended to suggest that the scope of the disclosure, including the claims, is limited to that embodiment.

Certain terms are used throughout the following description and the claims to refer to particular features or components. As one skilled in the art will appreciate, different people may refer to the same feature or component by different names. This document does not intend to distinguish between components or features that differ in name but not function. Moreover, the drawing figures are not necessarily to scale. Certain features and components described herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections. Further, the terms "axial" and "axially" generally mean along or parallel to a central or longitudinal axis. The terms "radial" and "radially" generally mean perpendicular to the central or longitudinal axis, while the terms "circumferential" and "circumferentially" generally mean disposed about the circumference, and as such, perpendicular to both the central or longitudinal axis and a radial axis normal to the central or longitudinal axis. As used herein, these terms are consistent with their commonly understood meanings with regard to a cylindrical coordinate system.

Figure 1:
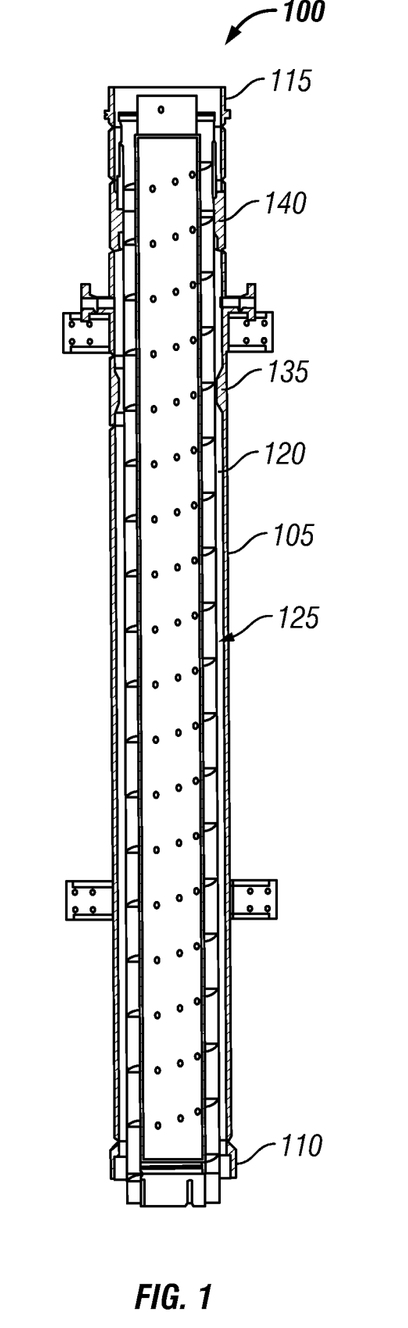
FIG. 1 is an axial cross-sectional view of a separator sub-assembly including a helix assembly in accordance with the principles disclosed herein.

Referring now to FIG. 1, there is shown a separator sub-assembly with a helix assembly in accordance with the principles disclosed herein. The separator sub-assembly 100 includes an outer casing 105 coupled between two end connectors 110, 115. The outer casing 105 has a throughbore 120 in which the helix assembly 125 is concentrically disposed. The outer casing 105 further includes a centralizer portion 135 and a helix assembly hang-off 140. The centralizer portion 135 extends radially inward to engage and centralize the helix assembly 125 within the throughbore 120. The helix assembly hang-off 140 extends radially inward to engage the helix assembly 125. Engagement between the hang-off 140 and the helix assembly 125 enables the helix assembly 125 to be suspended from the hang-off 140 within the throughbore 120 of the outer casing 105.

Figure 2A:
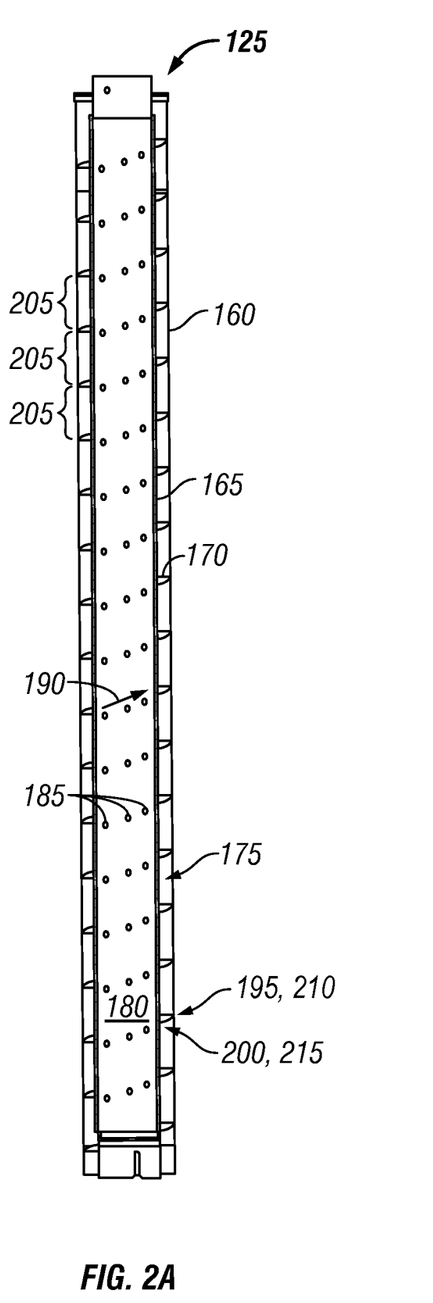
FIGS. 2A and 2B are axial cross-sectional and perspective side views, respectively, of the helix assembly of FIG. 1.
Figure 2B:
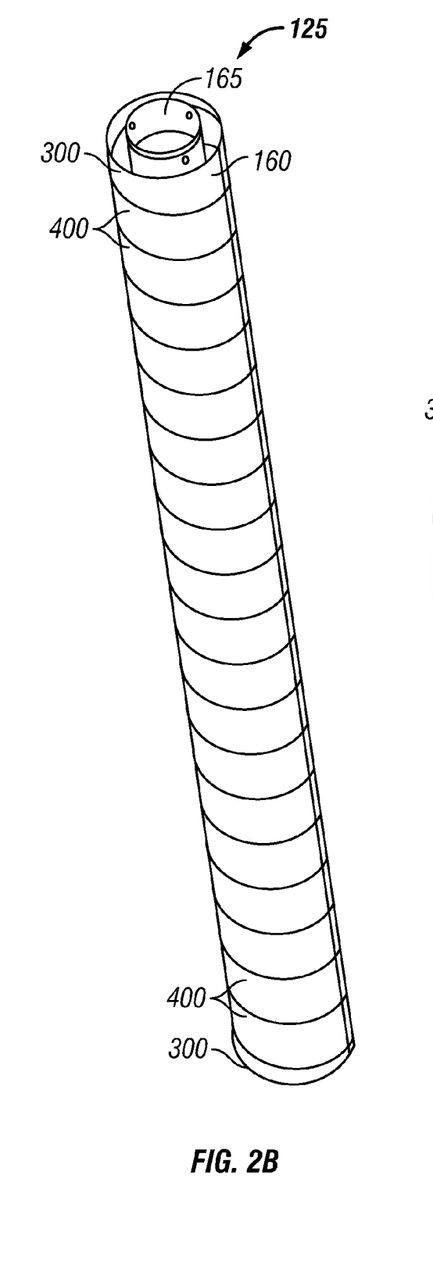

Turning to FIGS. 2A and 2B, the helix assembly 125 includes an intermediate casing 160, an inner casing 165, and a helix 170. The inner casing 165 is concentrically disposed within the intermediate casing 160, forming an annulus 175 therebetween. The inner casing 165 has a throughbore 180 and a plurality of gas inlet ports 185. The gas inlet ports 185 extend through the wall of the inner casing 165 along a path 190 that traverses the circumference of the inner casing 165 in a spiral fashion. Further, the gas inlet ports 185 enable fluid communication between the annulus 175 and the throughbore 180 of the inner casing 165.

The helix 170 is spiral-shaped plate having an edge 195 connected to the inner surface of the intermediate casing 160 and an opposing edge 200 connected to the outer surface of the inner casing 165. The helix 170 extends along the lengths of the intermediate and inner casings 160, 165 in a spiraling fashion, dividing the annulus 175 into a plurality of annulus segments 205. Further, the axial position of the helix 170 relative to the inner casing 165 is such that the gas inlet ports 185 are axially spaced apart from and just beneath the helix 170. The positioning of the gas inlet ports 185 in this manner aligns the ports 185 with the upper portion of the annulus segments 205 where separated gas phase tends to accumulate, as will be described.

During operation of the separator sub-assembly 100, a fluid, having a liquid and gas phase, such as but not limited to oil and gas, respectively, is introduced into the annulus 175 just above the helix 170. The fluid then flows along and over the helix 170 toward the lower end of the annulus 175. As the fluid traverses this path, the liquid phase of the fluid moves towards the lowest point of the helix 170, while the gas phase moves to the highest point of the annulus segments 205. Gas that has separated from the fluid passes from the annulus segments 205 through the gas inlet ports 185 into the throughbore 180 of the inner casing 165. Gas entering the inner casing 165 is then conveyed from the separator sub-assembly 100. As the gas phase is separated from the liquid phase in this manner and removed from the annulus 175, the fraction of liquid phase remaining in the fluid increases. Consequently fluid reaching the lower end of the annulus 175 is substantially liquid phase with little to no gas phase. The liquid is then conveyed from the separator sub-assembly 100.

The effectiveness of the separator sub-assembly 100 is dependent upon the ability to prevent gas phase that has separated from the fluid from remixing with the fluid as the fluid traverses the helix 170. Thus, connections or couplings 210, 215 between the helix 170 and the intermediate casing 160 and between the helix 170 and the inner casing 165, respectively, are preferably fluid-tight. In some embodiments, the couplings 210, 215 are weld seams. Furthermore, in some embodiments, at least one of the couplings 210, 215 is a seal weld. As used herein, a seal weld is a weld that enables sealing and prevents leakage between the components joined by the seal weld at the location of the seal weld. For instance, in embodiments wherein the coupling 210 is a seal weld, the coupling, or seal weld, 210 prevents leakage of the liquid phase, the gas phase, and/or the fluid between the helix 170 and the intermediate casing 160. In embodiments wherein the coupling 215 is a seal weld, the coupling, or seal weld, 215 prevents leakage of the liquid phase, the gas phase, and/or the fluid between the helix 170 and the inner casing 165.

Figure 3:
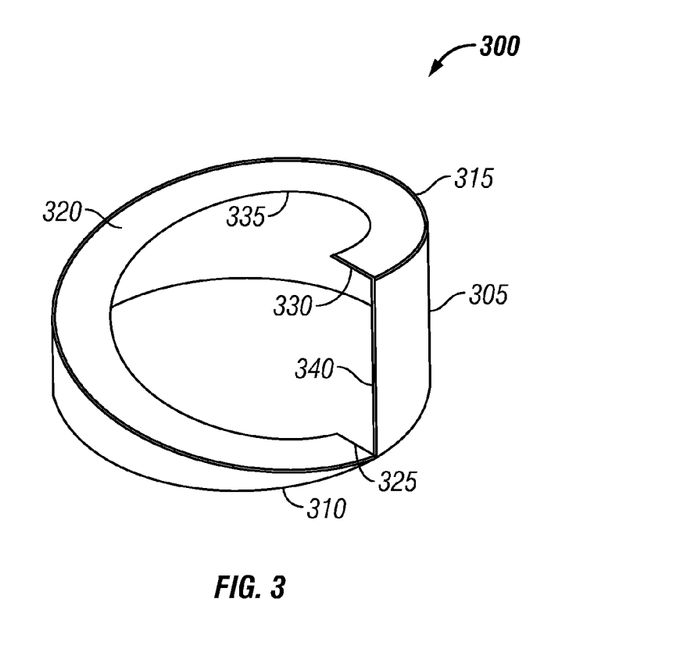
FIG. 3 is a perspective top view of a helix end segment of the helix assembly of FIGS. 2A and 2B.
Figure 4A:
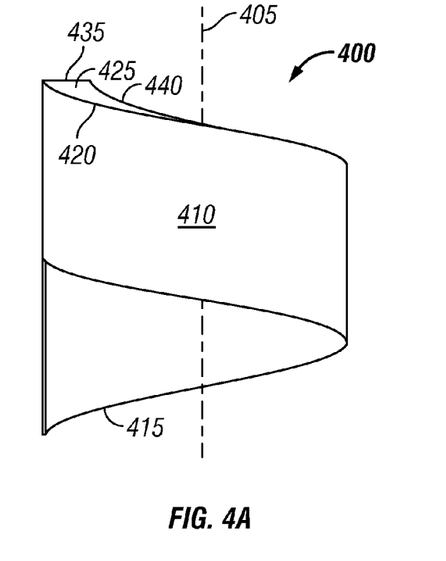
FIGS. 4A through 4D are side views of a helix intermediate segment of FIGS. 2A and 2B.
Figure 4B:
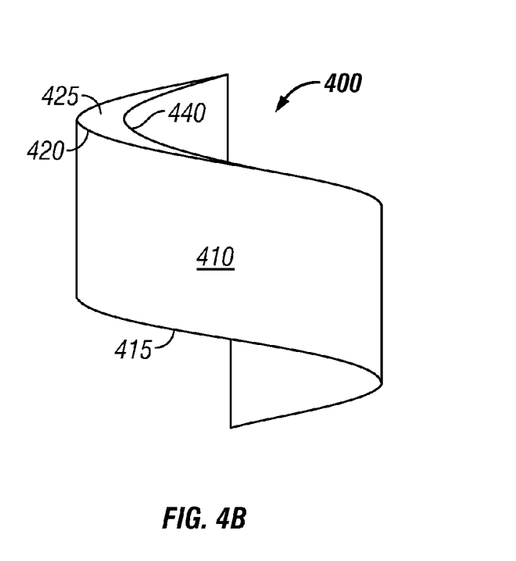
Figure 4C:
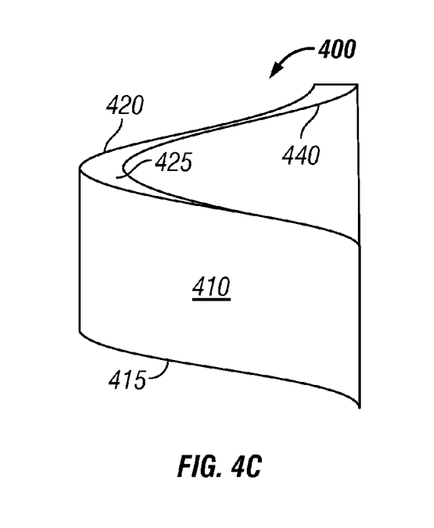
Figure 4D:
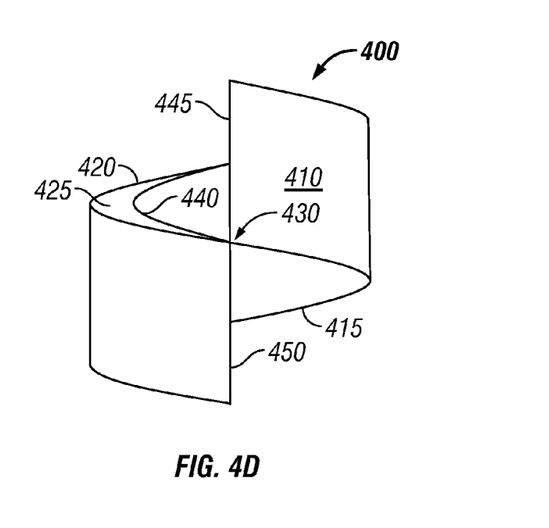
Figure 5A:
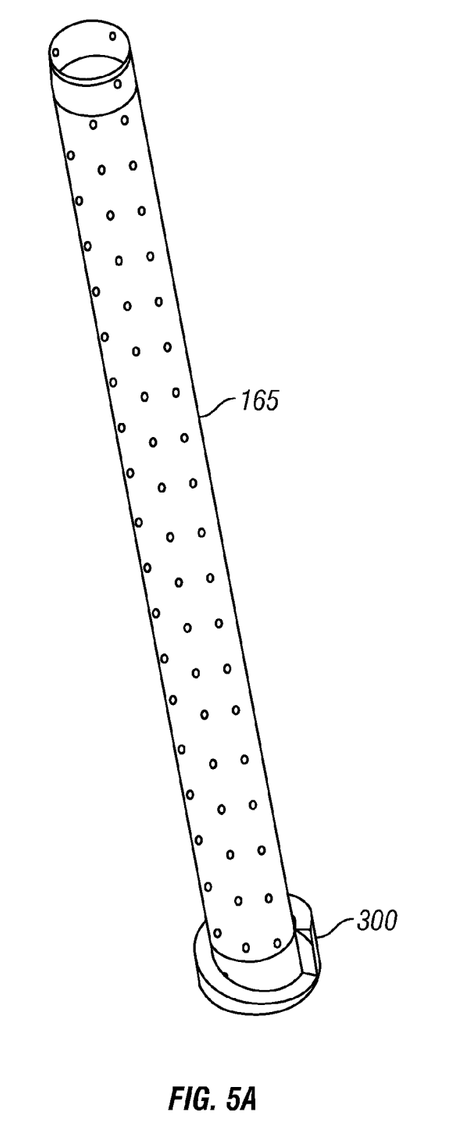
FIGS. 5A and 5B are perspective side and enlarged side views of the helix end segment of FIG. 3 joined to the inner pipe of FIGS. 2A and 2B.
Figure 5B:
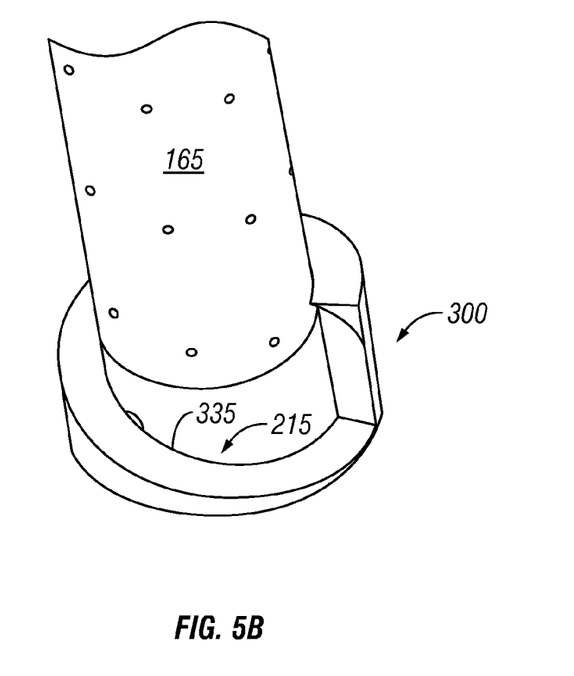

FIGS. 3 through 4D depict segments that enable fabrication of the helix assembly 125. As described below, the segments when assembled and joined via welding form the intermediate casing 160 and the helix 170 of FIGS. 2A and 2B. Referring first to FIG. 3, a helix end segment 300 is shown. The helix end segment 300 has an axially extending tubular portion 305 with a first circumferentially extending edge 310 and a second circumferentially extending edge 315. The circumferential edge 310 of the helix end segment 300 is planar, while the circumferential edge 315 is helical. The helix end segment 300 further includes a helical portion 320 connected to the tubular portion 305 along the circumferential edge 315. The helical portion 320 has two radially inward extending edges, a first radial edge 325 and a second radial edge 330, and a circumferentially extending edge 335 extending between the radial edges 325, 330. Extending from the second radial edge 330 of the helical portion 320, the tubular portion 305 further includes an axially extending edge 340.

Turning to FIGS. 4A through 4D, side views of an helix intermediate segment 400 are shown, each subsequent view rotated about the longitudinal centerline 405 of the helix intermediate segment 400 ninety degrees from the orientation depicted in the previous view. The helix intermediate segment 400 also has an axially extending tubular portion 410 with a lower circumferentially extending edge 415 and an upper circumferentially extending edge 420. The lower and upper circumferential edges 415, 420 are helical, each having a curvature that is substantially identical to that of the second circumferential edge 315 of the helix end segment 300.

The helix intermediate segment 400 further includes a helical portion 425 connected to the tubular portion 410 along the upper circumferential edge 420. The helical portion 425 is substantially identical to the helical portion 320 of the helix end segment 300. The helical portion 425 has two radially inward extending edges, a lower radial edge 430 (FIG. 4D, but best viewed in FIG. 6B) and an upper radial edge 435 (FIG. 4A), and a circumferentially extending edge 440 extending between the radial edges 430, 435. Extending from the upper radial edge 435 of the helical portion 425, the tubular portion 410 further includes an axially extending edge 445 (FIG. 4D). Similarly, extending from the lower radial edge 430 of the helical portion 425, the tubular portion 410 further includes an axially extending edge 450 (FIG. 4D).

The helix end and intermediate segments 300, 400 are configured to be stacked, as best illustrated by FIG. 2B, to form the intermediate casing 160. Referring briefly again to FIG. 2B, two helix end segments 300 form the lower and upper ends of the intermediate casing 160. A plurality of the helix intermediate segments 400 are stacked one on top of the other between the helix end segments 300. The upper helix end segment 300, when installed, is inverted relative to the lower helix end segment 300.

FIGS. 5A through 6B illustrate coupling of the helix end and intermediate segments 300, 400 to form the intermediate casing 160 and the helix 170, as well as the coupling of these components 160, 170 to the inner casing 165 to complete the helix assembly 125. Beginning with FIGS. 5A and 5B, the inner casing 165 is inserted into a helix end segment 300. This helix end segment 300 forms the lower end of the intermediate casing 160. The circumferential edge 335 (see also FIG. 3) of the helical portion 320 of the helix end segment 300 is then connected to the inner casing 165 via a coupling 215.

Figure 6A:
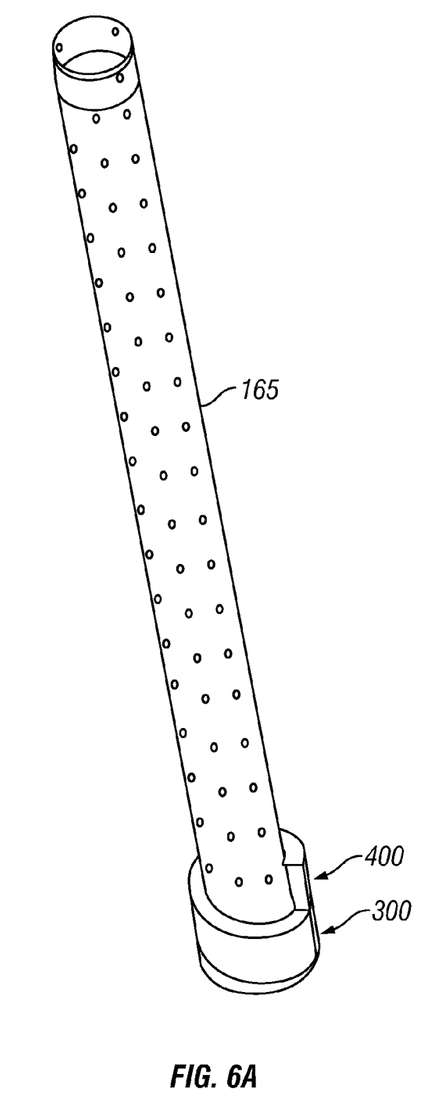
FIGS. 6A and 6B are perspective side and enlarged side views of the helix intermediate segment of FIG. 3 joined to the inner pipe of FIGS. 2A and 2B.
Figure 6B:
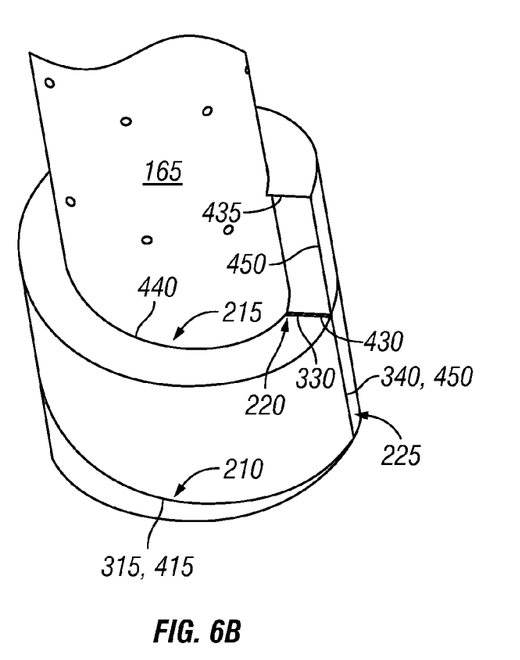

Turning to FIGS. 6A and 6B, a helix intermediate segment 400 is next installed on top of the helix end segment 300. The helix intermediate segment 400 is lowered about the inner casing 165 to seat on the helix end segment 300 such that the lower circumferential edge 415 of the helix intermediate segment 400 abuts the second circumferential edge 315 of the helix end segment 300. The circumferential edge 440 (see also FIG. 4A) of the helical portion 425 of the helix intermediate segment 400 is then connected to the inner casing 165 via a coupling 215. The second radial edge 330 (see also FIG. 3) of the helix end segment 300 and the lower radial edge 430 (best viewed in FIG. 6B) of the helix intermediate segment 400 are connected via a coupling 220. The second circumferential edge 315 of the helix end segment 300 and the lower circumferential edge 415 of the helix intermediate segment 400 are connected via a coupling 210. The axial edge 340 (see also FIG. 3) of the helix end segment 300 and the axial edge 450 (see also FIG. 4D) of the helix intermediate segment 400 are connected via a coupling 225.

Next, another helix intermediate segment 400 is lowered about the inner casing 165 to seat on the previously-installed helix intermediate segment 400 such that the circumferential edge 415 of the upper segment 400 abuts the circumferential edge 420 of the lower segment 400. The circumferential edge 440 of the helical portion 425 of the upper segment 400 is then connected to the inner casing 165 via a coupling 215. The lower circumferential edge 415 of the upper segment 400 and the upper circumferential edge 420 of the lower segment 400 are connected via a coupling 210. The axial edge 445 of the upper segment 400 and the axial edge 450 of the lower segment 400 are connected via a coupling 225. The lower radial edge 430 of the upper segment 400 and the upper radial edge 435 of the lower segment 400 are connected via a coupling 220. Subsequent helix intermediate segments 400 are installed in a similar fashion to yield the helix assembly 125 having a desired length.

Finally, to complete the helix assembly 125, another helix end segment 300 is lowered about the inner casing 165 in an inverted orientation, meaning upside down relative to the orientation shown in FIG. 3, to seat on the uppermost helix intermediate segment 400. The circumferential edge 335 of the helical portion 320 of the helix end segment 300 is then connected to the inner casing 165 via a coupling 215. The second circumferential edge 315 of the helix end segment 300 and the upper circumferential edge 420 of the helix intermediate segment 400 are connected via a coupling 210. The second radial edge 330 of the helix end segment 300 and the upper radial edge 435 of the helix intermediate segment 400 are connected via a coupling 220. The axial edge 340 of the helix end segment 300 and the axial edge 445 are connected via a coupling 225.

Couplings 210, 215, 220, 225 are preferably fluid-tight connections, which prevent the passage of fluid, liquid phase, and/or gas phase therethrough. In some embodiments, one or more of couplings 210, 215, 220, 225 are welds. In some of those embodiments, at least one of couplings 210, 215, 220, 225 is a seal weld.

Once the second helix end segment 300 is installed, the helix assembly 125 is complete and appears as shown in FIG. 2B. The helix assembly 125 may then be lowered into the throughbore 120 of the outer casing 105 and suspended from the helix assembly hang-off 140, as shown in FIG. 1. When installed, the helix assembly 125 is maintained in position within the outer casing 105 by the centralizer 135.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A separator assembly for separating gas and liquid components of a fluid stream, comprising:
   an outer casing; and
   a helix assembly inside the outer casing, comprising:
      an inner casing comprising a throughbore and inlet ports;
      helix segments, each segment comprising a tubular portion and a helical portion; and
      wherein the helix segments are connected to each other and the inner casing such that the tubular portions form an intermediate casing and the helical portions comprise a helix about the inner casing.

2. The separator assembly of claim 1, wherein each of the helix segments comprises a circumferential edge coupled to the inner casing.

3. The separator assembly of claim 1, wherein the helix segments are connected to each other and the inner casing with seal welds.

4. The separator assembly of claim 1, further comprising an annulus between the inner casing and the intermediate casing.

5. The separator assembly of claim 4, further comprising:
   wherein the inner casing comprises a plurality of inlet ports and a throughbore; and
   wherein the inlet ports enable fluid communication between the annulus and the throughbore.

6. The separator assembly of claim 5, wherein the inlet ports enable a separated gas component of the fluid stream to flow from the annulus to the throughbore.

7. The separator assembly of claim 6, wherein the axial position of the helix relative to the inner casing is such that the inlet ports are axially spaced apart from and just beneath the helix.

8. The separator assembly of claim 1, the helical portion comprising a spiral-shaped plate comprising an edge connected to the intermediate casing and an opposing edge connected to the inner casing outer surface, dividing an annulus between the inner and intermediate casings into annulus segments.

9. The separator assembly of claim 1, the outer casing further comprising a helix assembly hang-off extending radially inward to engage the helix assembly and enable the helix assembly to be suspended from the hang-off.

10. The separator assembly of claim 1, wherein the helix segments are connected to each other and the inner casing with fluid tight connections.

11. The separator assembly of claim 1 further comprising being locatable and operable subsea.

\* \* \* \* \*